(12) United States Patent
Sutton et al.

(10) Patent No.: US 7,999,053 B2
(45) Date of Patent: Aug. 16, 2011

(54) ALDEHYDE FUNCTIONAL SILOXANES

(75) Inventors: Lori Jean Sutton, Saginaw, MI (US); John Joseph Kennan, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 311 days.

(21) Appl. No.: 11/988,708

(22) PCT Filed: Jul. 5, 2006

(86) PCT No.: PCT/US2006/021855
§ 371 (c)(1),
(2), (4) Date: Jan. 11, 2008

(87) PCT Pub. No.: WO2007/011465
PCT Pub. Date: Jan. 25, 2007

(65) Prior Publication Data
US 2009/0137764 A1 May 28, 2009

Related U.S. Application Data

(60) Provisional application No. 60/700,362, filed on Jul. 18, 2005.

(51) Int. Cl.
*C08G 77/04* (2006.01)
(52) U.S. Cl. .................. 528/25; 528/15; 528/31
(58) Field of Classification Search .......... 528/25
See application file for complete search history.

(56) References Cited

U.S. PATENT DOCUMENTS

| | | | |
|---|---|---|---|
| 2,588,083 A * | 3/1952 | Burkhard et al. | |
| 2,917,530 A * | 12/1959 | Bailey | 556/455 |
| 2,970,150 A * | 1/1961 | Bailey | 549/215 |
| 3,159,601 A * | 12/1964 | Ashby | |
| 3,220,972 A * | 11/1965 | Lamoreaux | |
| 3,296,291 A * | 1/1967 | Chalk et al. | |
| 3,419,593 A * | 12/1968 | Willing | |
| 3,516,946 A * | 6/1970 | Modic | |
| 3,814,730 A * | 6/1974 | Karstedt | |
| 3,989,668 A * | 11/1976 | Lee et al. | |
| 4,784,879 A * | 11/1988 | Lee et al. | |
| 5,021,601 A * | 6/1991 | Frances et al. | |
| 5,036,117 A * | 7/1991 | Chung et al. | |
| 5,175,325 A * | 12/1992 | Brown et al. | |
| 5,739,246 A * | 4/1998 | Graiver et al. | |
| 7,576,170 B2 | 8/2009 | Perry et al. | |
| 2002/0010107 A1* | 1/2002 | Hoshino et al. | 510/101 |
| 2005/0136022 A1* | 6/2005 | Perry et al. | 424/70.12 |

FOREIGN PATENT DOCUMENTS

| | | | |
|---|---|---|---|
| DE | 10354259 | * | 6/2005 |
| EP | 0347895 | * | 11/1993 |
| EP | 0231093 | * | 1/1994 |
| WO | WO 2006014328 A1 * | | 2/2006 |

OTHER PUBLICATIONS

Dennis, W.; Preparation and Reactions of Siloxanylpropanals, J. Org. Chem., vol. 35, No. 12, 1970, pp. 4180-4183.
Schmidt, T.; Molybdenum Oxaddiene Catalysts for the Chemoselective Hydrosilylation of Unsaturated Ketones And Aldehydes, Tetrahedron Letters, vol. 35, No. 21 pp. 3513-3516, 1994.
Mason, B. W.; Synthesis of aldehyde functionalised polyhedral oligomeric silsesquioxanes, Journal of Chemical Society, Dalton Translation, 2001, pp. 11-23-1127.

* cited by examiner

*Primary Examiner* — Marc S Zimmer
*Assistant Examiner* — Lindsay Nelson
(74) *Attorney, Agent, or Firm* — Alan Zombeck

(57) ABSTRACT

A process for preparing aldehyde functional organopolysiloxanes and the products prepared therefrom is disclosed. The process involves a hydrosilylation reaction between an aldehyde having a non-conjugated unsaturated group with a polyorganohydrogensiloxane.

9 Claims, No Drawings

ALDEHYDE FUNCTIONAL SILOXANES

CROSS REFERENCE TO RELATED APPLICATIONS

This application is a U.S. national stage filing under 35 U.S.C. §371 of PCT Application No. PCT/US06/021855 filed on Jun. 5, 2006, currently pending, which claims the benefit of U.S. Provisional Patent Application No. 60/700362 filed Aug. 18, 2005 under 35 U.S.C. §119 (e). PCT Application No. PCT/US06/021855 and U.S. Provisional Patent Application No. 60/700362 are hereby incorporated by reference.

TECHNICAL FIELD

This invention relates to a process for preparing aldehyde functional organopolysiloxanes and the products prepared therefrom. The process involves a hydrosilylation reaction between an aldehyde having a non-conjugated unsaturated group with a polyorganohydrogensiloxane.

BACKGROUND

Aldehyde functional siloxanes are of great interest as commercial intermediates in the silicone industry due to their reactivity and hence versatility to form various organofunctional siloxanes. However, limited routes to aldehyde functional silicones exist and very few, if any, are presently practiced via large scale industrial processes.

One means for preparing aldehyde functional siloxanes involves the reaction of a hydride functional siloxane with an acetal containing an alpha-olefin group, for example *J. Org. Chem.*, (1970) 35(12) 4180. After the hydrosilylation is complete, the aldehyde is then liberated using an acidic catalyst and water. This reaction is typically biphasic, generates significant amounts of waste by-products and requires multiple steps to recover the desired product.

Ozonolysis is another route to aldehyde functional siloxanes. This route involves the exposure of an olefin functional siloxane to ozone to form silicone ozonides. The ozonides can be further reacted under acidic conditions to form aldehydes, see for example U.S. Pat. No. 5,739,246.

The Grignard coupling of bromophenyl dioxolanes with chlorosilanes and subsequent hydrosilylation with vinyl functional siloxanes, as described in the *Journal of the Chemical Society, Dalton Translation* (2001), (7), 1123-1127, is another method for preparing aldehyde functional siloxanes.

Another possible route to aldehyde functional silicones is the hydrosilylation of aldehydes that also contain other unsaturated carbon-carbon bonds with SiH functional siloxanes. This route would be desirable because of the versatililty of hydrosilylation reactions. However, this route has presumably not been employed due to the competing reaction of the addition of the SiH across the aldehyde carbonyl group resulting in a high percentage of hydrolyzable SiOC bonds.

EP0231093 B1 teaches a method of making aldehyde functional silicone gels by the hydrolysis of acetal and aldehyde functional silanes.

The present inventors have unexpectedly discovered a process to successfully hydrosilylate unsaturated groups on aldehydes, while minimizing the formation of SiOC bonds.

SUMMARY

This invention relates to a process for preparing aldehyde functional organopolysiloxanes comprising reacting;

A) a polyorganohydrogensiloxane, and
B) an aldehyde having a non-conjugated unsaturated group, via a hydrosilylation reaction.

This invention also relates to the products prepared by the process which are useful as intermediates to prepare other organofunctional polysiloxanes, but also have utility as additives in various formulations/uses such as in personal, household care, textile/fabric treatments, paper/tissue treatment, other surface treatments, coatings, silicone-organic composites, etc.

The present invention further provides aldehyde functional organopolysiloxanes comprising a siloxy unit of the formula $R_a^1 R^2 SiO_{(3-a)/2}$ wherein
$R^1$ is a monovalent hydrocarbon group,
$R^2$ is $—(CH_2)_{10}C(O)H$, or
$—(CH_2)_3CH(CH_2CH_3)CHC(CH_2CH_3)C(O)H$
a is zero to 2.

DETAILED DESCRIPTION

A) The Polyorganohydrogensiloxane

Component A) of the present invention is a polyorganohydrogensiloxane. As used herein, polyorganohydrogensiloxane is any organopolysiloxane containing at least one silicon-bonded hydrogen atom (SiH) per molecule. Organopolysiloxanes are well known in the art and are often designated as comprising any number of "M" siloxy units ($R_3SiO_{0.5}$), "D" siloxy units ($R_2SiO$), "T" siloxy units ($RSiO_{1.5}$), or "Q" siloxy units ($SiO_2$) where R can independently be any organic group, but commonly R is a hydrocarbon group, and most commonly R is methyl. Polyorganohydrogensiloxanes have similar structures, but have at least one SiH present on a M, D, or T siloxy unit, and can be represented as comprising of "$M^H$" siloxy units ($R_2HSiO_{0.5}$), "$D^H$" siloxy units (RHSiO), "$T^H$" siloxy units ($HSiO_{1.5}$). Thus, the polyorganohydrogensiloxanes useful in the present invention may comprise any number of M, $M^H$, D, $D^H$, T, $T^H$, or Q siloxy units, providing at least one siloxy unit contains SiH. Alternatively, the polyorganohydrogensiloxane may have an average formula of:

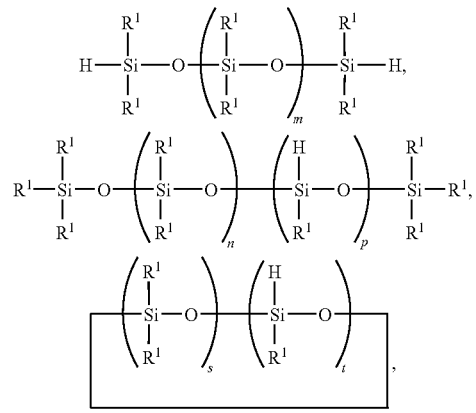

or a combination thereof, where m, p, and t>0, n and s≧0, and $R^1$ is a hydrocarbon.

B) The Aldehyde Having a Non-Conjugated Unsaturated Group

Component B) in the present invention is an aldehyde having a non-conjugated unsaturated group that is any organic molecule containing both an aldehyde and an unsaturated group that are non-conjugated with each other. The unsaturated group is typically a hydrocarbon unsaturated group such as an alkene or alkyne. The unsaturated group can be located anywhere within the aldehyde molecule providing it is non-conjugated with the aldehyde, alternatively it is non-conjugated with the aldehyde and is a terminal group. Representative examples of terminal unsaturated groups include; $CH_2=CH-$, $CH_2=CHCH_2-$, $CH_2=C(CH_3)-$, $CH\equiv C-$, or $CH\equiv CCH_2$. When the unsaturated group is a terminal one, it may be linked to the aldehyde group via a divalent organic group, alternatively a divalent hydrocarbon, or alternatively a divalent hydrocarbon containing one to 30 carbon atoms. Representative, non-limiting examples of unsaturated aldehydes useful as component B) in the present invention include;

3-butenal,
4-pentenal
4-phenyl-4-pentenal
10-undecenal,
2,4-diethyl-2,6-heptadienal,
2,4-dimethyl-2,6-heptadienal,
2,2-dimethyl-4-pentenal,
and 5-norbornene-2-carboxaldehyde.

The Hydrosilylation Reaction

Components A) and B) are reacted via a hydrosilylation reaction. Hydrosilylations are known in the art and require the addition of an appropriate catalyst. Suitable hydrosilylation catalysts for use in the present invention are known in the art and many are commercially available. Most commonly, the hydrosilylation catalyst is a platinum group metal and is added in an amount of 0.1 to 1000 ppm based on the weight of the reactants A) and B), alternatively 10 to 100 ppm of the platinum group metal. The hydrosilylation catalyst may comprise a platinum group metal selected from platinum, rhodium, ruthenium, palladium, osmium or iridium metal or organometallic compound thereof, or a combination thereof. The hydrosilylation catalyst is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix.

Suitable hydrosilylation catalysts are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

The hydrosilyation reaction can be conducted neat or in the presence of a solvent. The solvent can be an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha.

The amount of solvent can be up to 50 weight percent, but is typically from 20 to 50 weight percent, said weight percent being based on the total weight of components in the hydrosilylation reaction. The solvent used during the hydrosilylation reaction can be subsequently removed from the resulting reaction product mixture by various known methods.

The amount of components A) and B) used in the hydrosilylation reaction can vary, and typically the amounts used are expressed as the molar ratio of the unsaturated group in component B) vs the SiH content of component A). Typically, the hydrosilylation reaction is conducted with a slight molar excess of the unsaturated group vs SiH to ensure complete consumption of the SiH in the hydrosilylation reaction. Typically, the hydrosilylation reaction is conducted with a 20%, alternatively 10%, alternatively 5%, or alternatively 1% molar excess of the unsaturated group vs the molar SiH content of the polyorganohydrogensiloxane.

The present invention further provides aldehyde functional organopolysiloxanes comprising a siloxy unit of the formula $R_a^1R^2SiO_{(3-a)/2}$ wherein
$R^1$ is a monovalent hydrocarbon group,
$R^2$ is $-(CH_2)_{10}C(O)H$, or
$-(CH_2)_3CH(CH_2CH_3)CHC(CH_2CH_3)C(O)H$
a is zero to 2.

The aldehyde substituent $R^2$ is bonded to the organopolysiloxane via a Si—C bond. The aldehyde substituent can be present in the organopolysiloxane via linkage to any organosiloxy unit that is it may be present on any M, D, or T siloxy unit. In other words, the aldehyde functional siloxy unit can be a M unit $(R^1R_2^2SiO_{0.5})$, a D unit $(R^1R^2SiO)$, a T unit $(R^2SiO_{1.5})$, or a mixture of any of these. The aldehyde functional organopolysiloxane can also contain any number of additional M, D, T, or Q siloxy units of the general formula $(R_3SiO_{0.5})$, $(R_2SiO)$, $(RSiO_{1.5})$, or $(SiO_2)$, providing that the organopolysiloxane has at least one siloxy unit with $R^2$ present.

The weight average molecular weight $(M_W)$ or number average molecular weight $(M_N)$ of the aldehyde functional organopolysiloxane can vary, and is not limiting.

The amount of the aldehyde functional groups $(R^2)$ present in the organopolysiloxanes of the present invention can vary, but typically ranges from 0.1 to 40 mass percent, alternatively from 1 to 30 mass percent, or alternatively from 5 to 20 mass percent of the total mass of the organopolysiloxane.

Alternatively, the aldehyde functional organopolysiloxanes of the present invention can have the average formula;

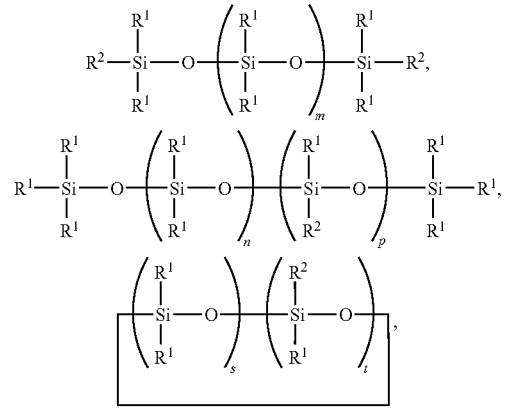

where m, p, and t>0, n and s≧0, $R^1$ is a hydrocarbon, and $R^2$ is $-(CH_2)_{10}C(O)H$ or $-(CH_2)_3CH(CH_2CH_3)CHC(CH_2CH_3)C(O)H$.

The aldehyde functional organopolysiloxanes of the present invention can be prepared according to any method known in the art, but typically can be prepared by the methods of the present invention, as described above.

EXAMPLES

These examples are intended to illustrate the invention to one of ordinary skill in the art and are should not be interpreted as limiting the scope of the invention set forth in the claims. All measurements were performed at 23° C., unless indicated otherwise.

Example #1

Comparative Example of an Attempt to Hydrosilylate a Compound in which the Reactive Olefin is Conjugated to the Aldehyde Carbonyl. Attempted Synthesis of $M^R D_{19} M^R$, where $M^R$=(OHCCH(CH$_3$)CH$_2$SiO$_{0.5}$)

The following general scheme illustrates the reaction performed in this comparative example.

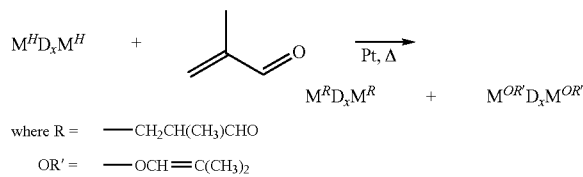

where R = —CH$_2$CH(CH$_3$)CHO
OR' = —OCH=C(CH$_3$)$_2$

To a 3 neck 50 mL flask was added 25.02 g (32.0 mmol Si—H) of an (HMe$_2$SiO$_{0.5}$) terminal siloxane having the average formula $M^H D_{18} M^H$, 2.69 g methacrolein (38.4 mmol), and 6.90 g hexanes. The flask was fitted with a condenser, temperature controller, nitrogen inlet, and a magnetic stirrer. The apparatus was purged with nitrogen, and then the temperature was raised to reflux while stirring. When the temperature reached 40° C., 0.86 mL of a hexane solution of Karstedt's catalyst (platinum complex with 1,3-divinyl-1,1,3,3-tetramethyldisiloxane) was added to give Pt concentration of 50 ppm Pt. At 4 hours, $^{29}$Si NMR showed 84.4% conversion of the Si—H groups with 93% selectivity for undesirable Si—OC formation as evidenced by the predominant endgroup peak at −12.7 ppm.

Example #2

Synthesis of $M^R D_{18} M^R$, where $M^R$=(OHCC(Et)=CHCH(Et)CH$_2$CH$_2$CH$_2$Me$_2$SiO$_{0.5}$) Via the Hydrosilylation of 2,4-Diethyl-2,6-Heptadienal with a $M^H D_{18} M^H$ Siloxane The following general scheme illustrates the reaction performed in this representative example.

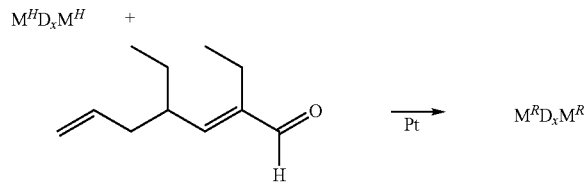

where, $M^R$ = 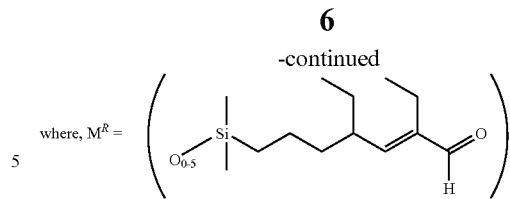

A 100 mL 3 necked round bottom flask was loaded with 20.0 g (28.0 mmol Si—H) of an (HMe$_2$SiO$_{0.5}$) terminal siloxane having the average formula $M^H D_{18} M^H$, 5.19 g (31.2 mmol) of 2,4-diethyl-2,6-heptadienal, and 8.39 g of toluene were weighed into a 100 mL 3-neck flask and stirred under static nitrogen. The mixture was then heated to 90° C., at which time 55.6 µL (~0.0014 mmol Pt) of a toluene solution of Karstedt's catalyst (platinum complex with 1,3-divinyl-1,1,3,3-tetramethyldisiloxane) was added. The reaction mixture was then heated to reflux. After 4.5 hours at reflux, infrared spectroscopy confirmed that 78% of the Si—H had reacted. An additional 0.39 g (2.35 mmol) of 2,4-diethyl-2,6-heptadienal and 27.8 µL (~0.0007 mmol Pt) was added. After an additional 2.5 hours at reflux, the infrared spectrum indicated that the Si—H was largely consumed. The bulk of the solvent and excess aldehyde was then removed by heating to 90° C. under vacuum. The $^{29}$Si NMR spectrum of the product showed that the $M^H$ peak at ~−7 ppm had dropped below the limit of quantitation. A new peak appeared at 7.17 ppm corresponding to the formation of the desired $M^R$ group. The NMR spectrum did not show any peaks indicative of byproducts formed by hydrosilylation of the carbonyl group.

Example #3

Synthesis of $M^R D_{18} M^R$, where $M^R$=(OHC(CH$_2$)$_{10}$Me$_2$SiO$_{0.5}$)— Via the Hydrosilylation of 10-Undecenal with a $M^H D_{18} M^H$ Siloxane The following general scheme illustrates the reaction performed in this representative example.

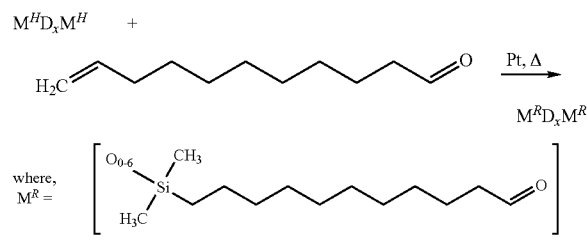

A 50 mL 3-neck flask was loaded with 17.41 g (24.4 mmol Si—H) of a (HMe$_2$SiO$_{0.5}$) terminal siloxane, 5.00 g (29.7 mmol) of 10-undecenal, and 5.60 g of toluene and stirred under static nitrogen, the mixture was then heated to ~90° C., at which time 66.7 µL (~0.0017 mmol Pt) of Karstedt's catalyst (platinum complexed to 1,3-divinyl-1,1,3,3-tetramethyldisiloxane) was added. The reaction mixture was then heated to reflux. After 4.5 hours at reflux, infrared spectroscopy was used to estimate that approximately 93% of the Si—H had reacted. An additional 0.20 g (1.19 mmol) of 10-undecenal and 21 µL (~0.0005 mmol Pt) was added. After an additional 3 hours at reflux, the infrared spectrum indicated that the Si—H was largely reacted. The toluene and excess aldehyde were then removed by heating to 100-110° C. under vacuum. The $^{29}$Si NMR spectrum of the stripped product showed that the $M^H$ peak at ~−7 ppm was below the limit of detection. The NMR spectrum indicated >97% of the endgroups contained the desired aldehyde, with less than 3% Si—O—C formation due to hydrosilylation across the carbonyl group.

Example #4

Synthesis of Norbornylcarboxaldehyde Functional Silicone, $M^R D_{18} M^R$, $R=(C_7H_{10})CHO$ The following general scheme illustrates the reaction performed in this representative example.

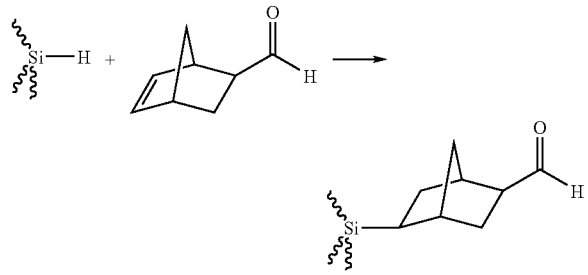

To a 3 neck 50 mL flask was added 15.00 g of a $(HMe_2SiO_{0.5})$ terminal siloxane (Si—H terminal siloxane, (21.0 meq Si—H) and 3.09 g 5-norbornene-2-carboxaldehyde (Aldrich, 25.3 meq olefin). The flask was outfitted with a condenser, temperature controller, nitrogen inlet, and a magnetic stirrer. While stirring under static $N_2$, the reaction mixture was heated to 80° C., and 360 μL of Karstedt's catalyst (platinum complexed to 1,3-divinyl-1,1,3,3-tetramethyldisiloxane) was added for a targeted Pt concentration ~100 ppm. An immediate exotherm to 125° C. was noted. The temperature controller was then set to 90° C. for 3 hours. FTIR of the reaction mixture at 1 hour showed an estimated 97% conversion of the Si—H. At 3 hours, $^{29}Si$ NMR indicated >86% of the endgroups contained the desired aldehyde, with 14% Si—O—C formation due to hydrosilylation across the carbonyl group.

The invention claimed is:

1. A process for preparing an aldehyde functional organopolysiloxane comprising reacting;
    A) a polyorganohydrogensiloxane, and
    B) an aldehyde having a non-conjugated unsaturated group, via a hydrosilylation reaction.
2. The process of claim 1 wherein the polyorganohydrogensiloxane is selected from the group having an average formula of:

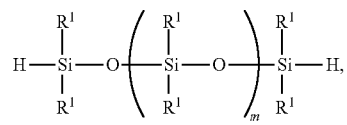

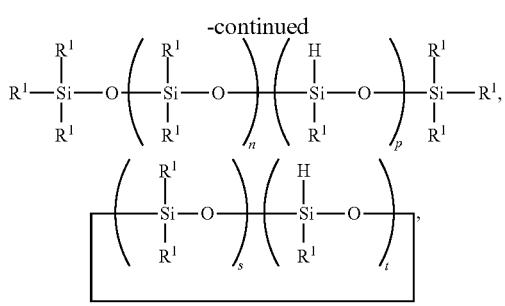

or a combination thereof, where m, p, and t >0, n and s ≧0, and $R^1$ is a hydrocarbon.

3. The process of claim 2 wherein $R^1$ is methyl.
4. The process of claim 1 wherein the aldehyde contains a terminal unsaturated hydrocarbon group.
5. The process of claim 4 wherein the terminal unsaturated hydrocarbon group is an allyl group.
6. The process of claim 1 wherein the aldehyde is 10-undecenal.
7. The product produced by the process according to claims 1.
8. An organopolysiloxane comprising a siloxy unit of the formula $R_a^1 R^2 SiO_{(3-a)/2}$ wherein
    $R^1$ is a monovalent hydrocarbon group,
    $R^2$ is —$(CH_2)_{10}C(O)H$ or —$(CH_2)_3CH(CH_2CH_3)CHC(CH_2CH_3)C(O)H$, and
    a is zero to 2.
9. The organopolysiloxane of claim 8 wherein the organopolysiloxane has the average formula;

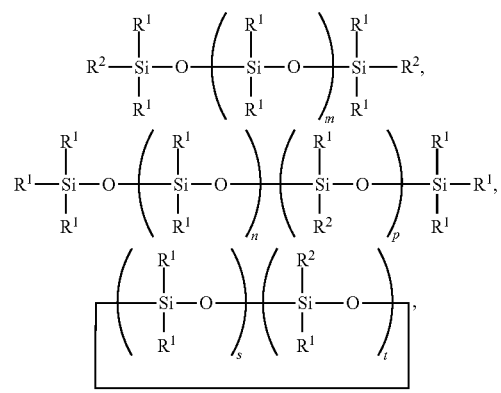

where m, p, and t>0, n and s≧0, $R^1$ is a hydrocarbon, and
    $R^2$ is —$(CH_2)_{10}C(O)H$ or —$(CH_2)_3CH(CH_2CH_3)CHC(CH_2CH_3)C(O)H$.

* * * * *